Patented Feb. 11, 1947

2,415,719

UNITED STATES PATENT OFFICE 2,415,719

GELATIN VEHICLE

Harold A. Abramson, New York, N. Y.

No Drawing. Application February 10, 1944, Serial No. 521,811

8 Claims. (Cl. 167—82)

This invention relates, generally, to vehicles for retarding the absorption or activity of subcutaneously injected drugs, and particularly to gelatin base vehicles for retarding the absorption or activity of epinephrine compounds.

The use of a colloidal mass such as acacia, agar, or gelatin, to retard absorption of drugs and biologically active materials injected subcutaneously has been widely employed. At the present time there is a special need for a slowly acting epinephrine drug in an improved form that may be conveniently employed for the maintenance of blood pressure and cardiac output in the treatment of traumatic and other forms of shock in military operations. There also continues to be an important need for a slowly acting epinephrine drug for the treatment of allergies.

It has been found that gelatin solutions are, in general, the most satisfactory vehicles presently available for retarding the action or absorption of subcutaneously injected drugs, and allergens such as epinephrine and ephedrin. However, the use of ordinary gelatin U. S. P. has not been possible heretofore since vehicles containing this material in effective concentrations are gels at room temperature and therefore cannot be used in an injection needle without preheating, and must be stored in a refrigerator. Considerable effort has been devoted to overcoming these defects and some progress has been made by autoclaving the gelatin so as to modify its gelling properties and composition. This development has been reported in the literature in the paper Spain, W. C., Strauss, M. B., and Fuchs, A. M.; A slowly absorbed gelatin—epinephrine mixture, J. Allergy 10: 209, 1939. However, vehicles containing autoclaved gelatin still require heating prior to injection, and must normally be stored in a refrigerator since they will not remain sterile at room temperature for extended periods of time.

Accordingly, the object of my invention, in its broader aspects, is the provision of improved vehicles for retarding the activity or absorption of subcutaneously injected drugs.

More specifically, an important object of my invention is the provision of gelatin base vehicles for subcutaneously injected drugs, such as epinephrine and ephedrine, which vehicles are liquid at room temperature, will remain sterile in stoppered bottles at room temperature without being stored in a refrigerator, but which if so stored will readily resume the liquid phase without heating.

Another important object of my invention is the modification of the gelling properties of gelatin by the addition of urea so that autoclaving thereof is no longer either necessary or desirable in many instances.

Other objects of my invention will in part be obvious, and will in part appear hereinafter.

Briefly stated, my invention resides in the inclusion of urea with either autoclaved gelatin or gelatin U. S. P. However, for a more complete understanding of the nature and scope of my invention reference may be had to the following detailed description thereof setting forth illustrative embodiments and compositions.

In order to determine the effect of the addition of urea in a preliminary way, to a commercial sample of epinephrine in an autoclaved gelatin base (16 per cent), which was a solid at a room temperature of 23° C., upon melting was added 16 per cent of urea. The resulting product did not congeal at room temperature, but gelled in the icebox. After removal from the icebox, this gelatin-urea mixture became liquid at room temperature and remained so throughout its period of use. It was kept in an ordinary glass vial, rubber stoppered, and exposed to artificial light for a period of one month, during which time it was administered to a group of patients. This modified gelatin-urea mixture apparently had the same slow epinephrine action that it originally possessed in commercial form. The solution in the presence of urea was quite plastic, and on shaking the bubbles which formed rose very slowly. It was essentially a transition between a sol and a gel and as gelatinous as the heated commercial material prior to injection.

In order to determine accurately the effect of urea on different concentrations of gelatin, solutions containing 1, 3, 5, and 10 per cent of unautoclaved gelatin U. S. P. were prepared. Each of these solutions contained 15 per cent of urea and all of them gelled in the icebox. On removal from the icebox all of the solutions became liquid or semi-liquid at a room temperature of 22° C. The gelling was greatest in the solution containing the highest concentration of gelatin. It was quite obvious on inspection that the 10 per cent gelatin mass was more plastic than the autoclaved commercial preparation referred to above. Table I below compares the plasticity of this commercial preparation at room temperature with the plasticity or gel strength of different concentrations of unautoclaved U. S. P. gelatin examined at room temperature. Plasticity measurements were made by studying the outflow time of a given volume in a viscosimeter adapted for preparations of this type.

TABLE I

| Gelatin concentrations | Relative values of plasticity (apparent viscosity) |
|---|---|
| Commercial preparation (16% gelatin autoclaved) | 57 |
| 1% gelatin U. S. P | 6 |
| 3% gelatin U. S. P | 10 |
| 5% gelatin U. S. P | 17 |
| 10% gelatin U. S. P | 180 |

All solutions contain 15% urea.

It will be noted that the unautoclaved gelatin containing 10 per cent gelatin is three times as plastic or gel-like as the commercial preparation. The data of Table I plotted as plasticity against concentration of gelatin showed that commercial autoclaved preparation containing 16 per cent of gelatin roughly corresponded to an unaltered, unautoclaved 8 per cent solution of gelatin U. S. P. under the conditions specified. The specimens described in Table I were placed in the icebox overnight to allow gelling to occur and the next day the rate of liquefaction was studied with the data shown in Table II being obtained.

TABLE II

| Concentration of gelatin U. S. P. 15% urea | After 30 minutes at room temperature | After 1 hour and 15 minutes |
|---|---|---|
| 1 | Liquid | Liquid. |
| 3 | do | Do. |
| 5 | Semiliquid | Do. |
| 10 | Gel | Semiliquid and readily passes through 26 gauge needle. |

Experiments in which my autoclaved samples of gelatin U. S. P. were compared with 10 per cent gelatin U. S. P. (not autoclaved) disclosed that in the presence of 15 per cent urea, 10 per cent gelatin U. S. P. was much more plastic at room temperature than 17 per cent gelatin U. S. P. autoclaved at 10 or 20 pounds for thirty minutes. These results are shown in Table III.

TABLE III

| Gelatin preparations | Relative values of plasticity (apparent viscosity) |
|---|---|
| 10% gelatin not autoclaved | 150 |
| 17% gelatin autoclaved 10 pounds (30 min.) | 60 |
| 17% gelatin autoclaved 20 pounds (30 min.) | 30 |

All contain 15 per cent urea.

In order to determine the effect of urea concentration on the gelatin of gelatin-urea mixtures, samples were prepared each containing 8.5 per cent of gelatin and from 0.0% to 30% of urea. The six samples were placed in the icebox to gel overnight and the next day they were removed and studied when they had reached a temperature of 20° C. after thirty minutes. Table IV below indicates the state of plasticity of these six solutions.

TABLE IV

| Per cent urea | State |
|---|---|
| 0 | Gel. |
| 5 | Gel. |
| 10 | Sol-gel. |
| 15 | Sol. |
| 20 | Sol. |
| 30 | Sol. |

The data of Table IV indicates, that for a 8.5% concentration of gelatin, 10 per cent or more of urea is required to give a solution which readily passes through an ordinary hypodermic needle. However, even 5 per cent of urea reduces the apparent viscosity of a 10 per cent gelatin solution appreciably. Although this lower concentration of urea might be suitable and sufficient to produce sufficient fluidity for injection, in my presently preferred preparation a higher concentration of 15 per cent was adopted because: (1) The bacteriostatic value is higher with more urea, and (2) liquefaction occurs more quickly with a higher concentration of urea after the gelatin-urea mixture is taken out of the icebox and kept at room temperature prior to injection.

Tests have been made of my gelatin-urea mixtures kept at room temperature without placing the solutions in the icebox. Such tests have proven successful and a lower concentration (5 per cent) of urea may be all that will be required to provide a mixture remaining liquid at room temperature if the mixture is not kept in the icebox.

A comparison of the apparent viscosity (plasticity) of autoclaved gelatin and gelatin that was not autoclaved is found in Table V below.

TABLE V

| Type of solution | Treatment | Relative values of plasticity |
|---|---|---|
| 16% gelatin, 15% urea | Autoclaved 30 min. 20 lbs. | 118 |
| 16% gelatin U. S. P., 15% urea | Not autoclaved | 270 |
| 8% gelatin U. S. P., 15% urea | do | 80 |
| 10% gelatin U. S. P., 15% urea | do | 180 |

Table V shows that the 10 per cent gelatin solution (unautoclaved) containing 15 per cent urea was more plastic than a 16 per cent autoclaved solution of gelatin containing urea at room temperature. This is in harmony with the data given above relative to the commercial preparation.

Table VI below illustrates that a 9 per cent solution of unautoclaved gelatin containing 15 per cent of urea is as plastic a mass at body temperature as a 16 per cent solution of gelatin containing no urea after the 16 per cent solution was autoclaved for thirty minutes at 20 pounds pressure.

*Plasticity measurements of different gelatin solutions at body temperature*

TABLE VI

| Kind of gelatin | Relative values of plasticity |
|---|---|
| 16% gelatin U. S. P | 298 |
| 16% gelatin autoclaved 30 min.—20 pounds | 127 |
| 16% gelatin U. S. P., 15% urea | 350 |
| 16% gelatin, 15% urea autoclaved 30 min.—20 pounds | 142 |
| 9% gelatin U. S. P | 100 |
| 9% gelatin U. S. P., 15% urea | 120 |

The data in Table VI indicates that the urea contributes to the plasticity (probably Newtonian viscosity) of the solutions. It is interesting and of significance that at room temperatures the addition of urea to gelatin has the effect of decreasing the plasticity, while at body temperature the addition of urea to gelatin has the effect of increasing the plasticity.

A specific preparation embodying the features of my invention which has been successfully tested clinically, consisted of a 1:500 epinephrine salt in a vehicle containing 8.5 per cent gelatin U. S. P. and 15 per cent urea. A 23 gauge needle, three-quarters of an inch in length, was found most suitable for the subcutaneous injection of this preparation.

By the expressions "epinephrine salt" and "epinephrine compound" it is intended to include epinephrine, epinephrine phosphate, epinephrine hydrochloride, and the other forms in which this chemical may be used. Any of the usual concentrations of the epinephrine compounds may be used with my improved gelatin-urea vehicles.

The exact functions of the gelatin and the added urea are not known with exactness at this time. It is possible that the epinephrine forms complexes with the gelatin and that the slow action of the epinephrine may be due to the slow breakdown of these complexes. However, it is also quite possible that the slow action of the epinephrine is due to the plastic mass of the gelatin. In this latter case the fact that urea additions decrease the plasticity at room temperature but increase the plasticity at body temperature is of material significance since the urea will have the dual effect of increasing fluidity and also slowing up the activity or absorption of the epinephrine.

It will be understood that my gelatin-urea solutions are not limited solely to use as vehicles for epinephrine compounds, but that they may also be used as vehicles for certain other subcutaneously injected compounds.

Having fully described my invention and the presently preferred embodiments thereof it is intended that this detailed description shall be by way of illustration and not by way of limitation.

By the expression "gelatinous composition" used hereinafter in the appended claims, it is intended to include either autoclaved or unautoclaved gelatin.

I claim:

1. A slowly acting epinephrine composition adapted for subcutaneous injection comprising an epinephrine compound dissolved in a vehicle comprising gelatin and urea said vehicle having a plasticity at room temperature permitting it to be injected subcutaneously and having an increased plasticity at body temperature so as to retard absorption of said drug into the system.

2. A slowly acting epinephrine composition adapted for subcutaneous injection comprising an epinephrine compound dissolved in a vehicle comprising autoclaved gelatin and urea, said vehicle having a plasticity at room temperature permitting it to be injected subcutaneously and having an increased plasticity at body temperature so as to retard absorption of said drug into the system.

3. A slowly acting epinephrine composition adapted for subcutaneous injection comprising an epinephrine compound dissolved in a vehicle comprising a gelatin solution containing at least 5% by weight of urea.

4. A slowly acting epinephrine composition adapted for subcutaneous injection comprising a solution of a 1:500 epinephrine salt in a vehicle containing about 8.5% by weight of gelatin U. S. P. and about 15% by weight of urea.

5. A pharmaceutical composition particularly adapted for subcutaneous injection, comprising, a drug carried in a vehicle comprising an aqueous solution of gelatin and urea, said vehicle having a plasticity at room temperature permitting it to be injected subcutaneously and having an increased plasticity at body temperature so as to retard the absorption of said drug into the system.

6. The composition of claim 5 wherein the gelatin is autoclaved.

7. The composition of claim 5 wherein the urea concentration is at least 5% by weight.

8. The composition of claim 5 wherein the gelatin concentration is about 8.5% by weight and the urea concentration is about 15% by weight.

HAROLD A. ABRAMSON.

REFERENCES CITED

The following references are of record in the file of this patent:

UNITED STATES PATENTS

| Number | Name | Date |
|---|---|---|
| 1,950,483 | Christopher et al | Mar. 13, 1934 |

OTHER REFERENCES

Spain, Journal of Allergy, vol. 10, page 209 (1939). (Copy in Dept. of Agriculture Library.)

Carpenter et al., Chemical Abstracts, vol. 33, page 25 (1939). (Copy in Sci. Lib.)

Heim, Chemical Abstracts, vol. 21, pages 7901, 7902 (1937). (Copy in Sci. Lib.)

Steigmann, Chemical Abstracts, vol. 31, page 7776 (1937). (Copy in Scientific Library.)